US008108696B2

(12) United States Patent  (10) Patent No.: US 8,108,696 B2
Triplett  (45) Date of Patent: *Jan. 31, 2012

(54) OPTIMIZING NON-PREEMPTIBLE READ-COPY UPDATE FOR LOW-POWER USAGE BY AVOIDING UNNECESSARY WAKEUPS

(75) Inventor: Joshua A. Triplett, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 739 days.

This patent is subject to a terminal disclaimer.

(21) Appl. No.: 12/178,752

(22) Filed: Jul. 24, 2008

(65) Prior Publication Data

US 2010/0023732 A1  Jan. 28, 2010

(51) Int. Cl.
G06F 1/26 (2006.01)
(52) U.S. Cl. ......................................... 713/300; 713/323
(58) Field of Classification Search .................. 713/323, 713/300
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 3/1997 | Slingwine et al. | |
| 5,727,209 A | 3/1998 | Slingwine et al. | |
| 6,219,690 B1 | 4/2001 | Slingwine et al. | |
| 6,886,162 B1 | 4/2005 | McKenney | |
| 6,996,812 B2 | 2/2006 | McKenney | |
| 7,093,036 B2 | 8/2006 | Raghunath et al. | |
| 7,287,135 B2 | 10/2007 | McKenney et al. | |
| 7,353,346 B2 | 4/2008 | McKenney et al. | |
| 2005/0149634 A1 | 7/2005 | McKenney | |
| 2005/0198030 A1 | 9/2005 | McKenney | |
| 2006/0100996 A1 | 5/2006 | McKenney | |
| 2006/0112121 A1 | 5/2006 | McKenney et al. | |
| 2006/0117072 A1 | 6/2006 | McKenney | |
| 2006/0123100 A1 | 6/2006 | McKenney | |
| 2006/0130061 A1* | 6/2006 | Bauer et al. | 718/100 |
| 2006/0265373 A1 | 11/2006 | McKenney et al. | |
| 2007/0083565 A1 | 4/2007 | McKenney | |
| 2007/0101071 A1 | 5/2007 | McKenney | |
| 2007/0198520 A1 | 8/2007 | McKenney et al. | |
| 2007/0226440 A1 | 9/2007 | McKenney et al. | |
| 2007/0238437 A1 | 10/2007 | Jaakkola | |
| 2007/0266209 A1 | 11/2007 | McKenney et al. | |
| 2008/0033952 A1 | 2/2008 | McKenney et al. | |
| 2008/0040720 A1 | 2/2008 | McKenney et al. | |
| 2008/0082532 A1 | 4/2008 | McKenney | |

(Continued)

OTHER PUBLICATIONS

J. Seigh, "RCU + SMR for preemptive kernel/user threads," Linux Kernel Mailing List, May 9, 2005, 2 pages.

(Continued)

Primary Examiner — Mark Rinehart
Assistant Examiner — Nimesh G Patel
(74) Attorney, Agent, or Firm — Walter W. Duft (57) ABSTRACT

A technique for low-power detection of a grace period following a shared data element update operation that affects non-preemptible data readers. A grace period processing action is implemented that requires a processor that may be running a non-preemptible reader of the shared data element to pass through a quiescent state before further grace period processing can proceed. A power status of the processor is also determined. Further grace period processing may proceed without requiring the processor to pass through a quiescent state if the power status indicates that quiescent state processing by the processor is unnecessary.

20 Claims, 7 Drawing Sheets

U.S. PATENT DOCUMENTS

| | | | |
|---|---|---|---|
| 2008/0140951 | A1 | 6/2008 | McKenney et al. |
| 2008/0177742 | A1 | 7/2008 | McKenney et al. |
| 2009/0006403 | A1* | 1/2009 | McKenney ............... 707/8 |
| 2009/0077080 | A1* | 3/2009 | McKenney ............... 707/8 |
| 2009/0254764 | A1* | 10/2009 | Mckenney et al. .......... 713/300 |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," LInux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

T. Gleixner, "High Resolution Timers/Dynamic Ticks-V2", LWN.net, Oct. 1, 2006, 6 pages.

P. Mckenney, "Sleepable RCU", LWN.net, Oct. 9, 2006, 10 pages.

O. Nesterov, "cpufreq_tsc( ) as core_initcall_sync", LKML.org, Nov. 19, 2006, 2 pages.

P. McKenney, "Using RCU in the Linux 2.5 Kernel", Kernel Korner, Oct. 1, 2003,11 pages.

A. Kleen, "How to do nothing efficiently or better laziness: No Idle tick on x86-64", 2005, 16 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al, "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN.net, Oct. 8, 2007, 27 pages.

T. Gleixner, "high resolution timers/dynamic ticks-V2," LWN.net, Oct. 1, 2006, 6 pages.

Non-Final Office Action dated Apr. 6, 2011 from copending U.S. Appl. No. 12/061,819.

Amendment and Response to Office Action dated Jul. 6, 2011 from copending U.S. Appl. No. 12/061,819.

* cited by examiner

OPTIMIZING NON-PREEMPTIBLE READ-COPY UPDATE FOR LOW-POWER USAGE BY AVOIDING UNNECESSARY WAKEUPS

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a non-preemptive real-time computing environment with processors capable of assuming low-power states.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is available for the benefit of operations that access the data following the update. These other read operations will never see the stale data and so the updater does not need to be concerned with them. However, the updater does need to avoid prematurely removing the stale data being referenced by the first group of read operations. Thus, in the second (deferred update) phase, the old data state is only removed following a "grace period" that is long enough to ensure that the first group of read operations will no longer maintain references to the pre-update data. The second-phase update operation typically comprises freeing a stale data element. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

Figure 1A:
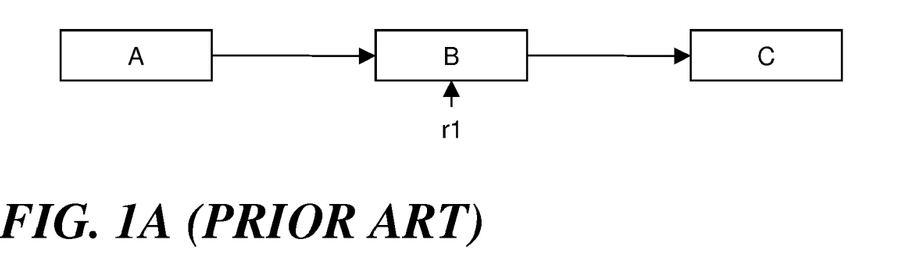
FIGS. 1A-1D are diagrammatic representations of a linked list of data elements undergoing a data element replacement according to a conventional read-copy update mechanism.
Figure 1B:
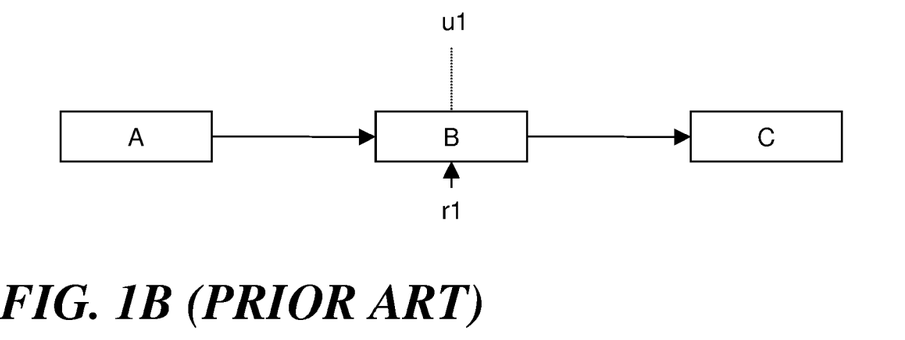
Figure 1C:
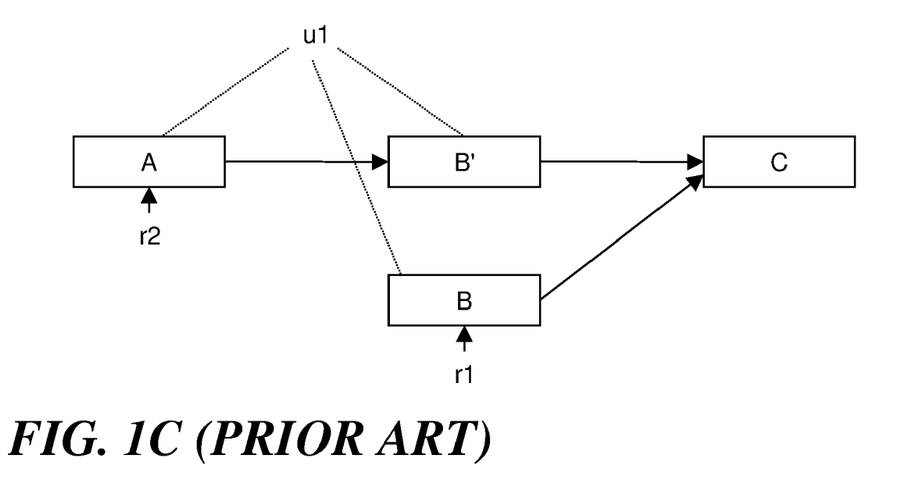

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization or a designated update thread could be used to serialize data updates. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
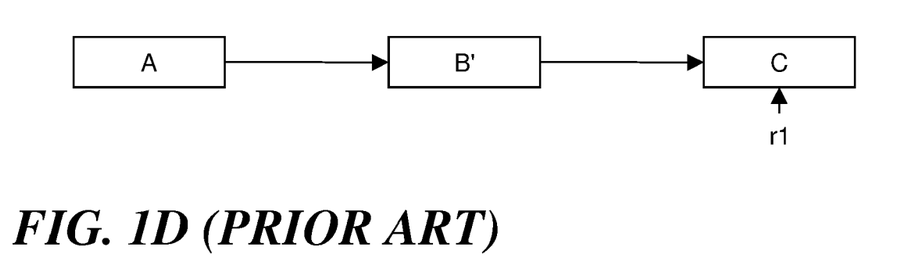

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

Figure 2A:
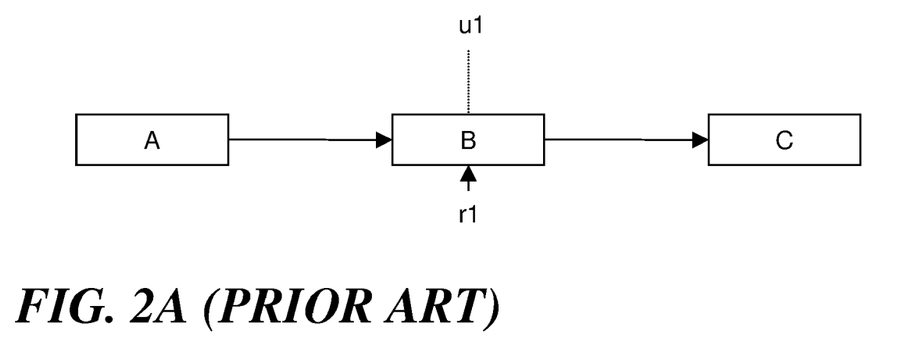
FIGS. 2A-2C are diagrammatic representations of a linked list of data elements undergoing a data element deletion according to a conventional read-copy update mechanism.
Figure 2B:
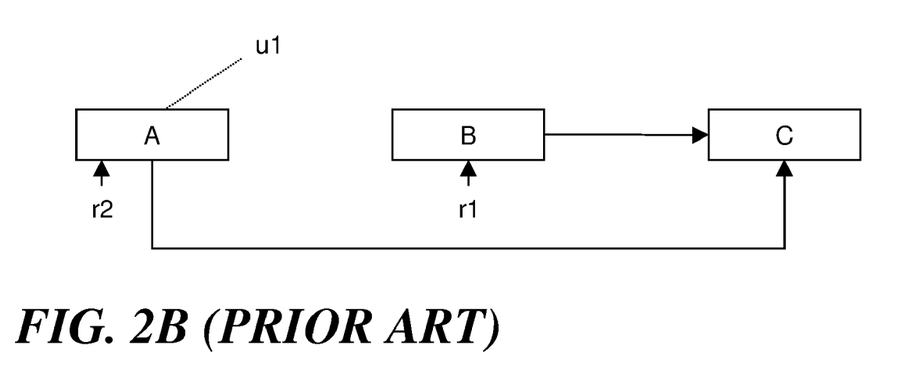
Figure 2C:
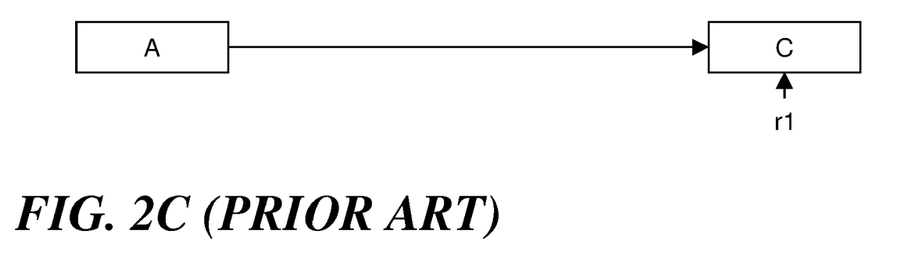

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes (or threads within a process) having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU running non-preemptible code (as can other operations that will not be listed here). In some read-copy update implementations adapted for preemptible readers, all read operations that are outside of an RCU read-side critical section are quiescent states.

Figure 3:
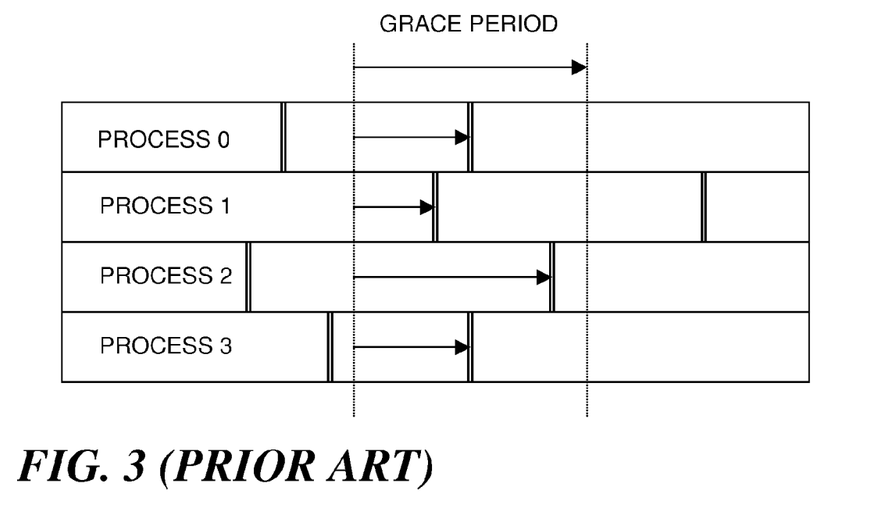
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period.

All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,442,758, entitled "System And Method For Achieving Reduced Overhead Mutual-Exclusion And Maintaining Coherency In A Multiprocessor System Utilizing Execution History And Thread Monitoring." Another commonly used technique is to have updaters block (wait) until a grace period has completed.

It will be appreciated from the foregoing discussion that the fundamental operation of the read-copy update (RCU) synchronization technique entails waiting for all readers associated with a particular grace period to complete. Multiprocessor implementations of RCU must therefore observe or influence the actions performed by other processors. Non-preemptible variants of RCU require readers to avoid preemption and rescheduling. Orderly grace period processing may be ensured by waiting for execution on each reader's processor to pass through a quiescent state. However, the RCU implementation needs to coordinate with those processors to detect when a quiescent state has been reached. Moreover, the RCU implementation may choose to force the processors to enter quiescent states as soon as possible rather than waiting. This may occur if the RCU implementation decides that it has waited too long or that it has too many waiters.

RCU implementations used for non-preemptible readers do not currently account for processor power states. Modern processors benefit greatly from low-power states (such as, on Intel processors, the C1E halt state, or the C2 or deeper halt states). These low-power states have higher wakeup latency, so processors and operating systems do not choose to enter these states if frequently forced to wake up. Operating systems with mechanisms such as the dynamic tick framework (also called "dyntick" or "nohz") in current versions of the Linux® kernel can avoid the need for regular timer interrupts (a frequent cause of unnecessary wakeups) and instead only wake up processors when they need to perform work, allowing for better utilization of low-power states. Thus, RCU implementations that force other processors to wake up and perform work can lead to higher power usage on processors with low-power higher-latency states. This may result in decreased battery life on battery-powered systems (such as laptops and embedded systems), higher power usage (particularly problematic for large data centers), increased heat output, and greater difficulty achieving compliance with various standards for environmentally friendly or "green" systems. Applicant has determined that it would be desirable to avoid unnecessary wakeups during RCU grace period processing.

SUMMARY OF THE INVENTION

A method, system and computer program product are provided for low-power detection of a grace period following a shared data element update operation that affects non-preemptible data readers. A grace period processing action is implemented that requires a processor that may be running a non-preemptible reader of the shared data element to pass through a quiescent state before further grace period processing can proceed. A power status of the processor is also determined. Further grace period processing may proceed without requiring the processor to pass through a quiescent state if the power status indicates that quiescent state processing by the processor is unnecessary.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENTS

Figure 4:
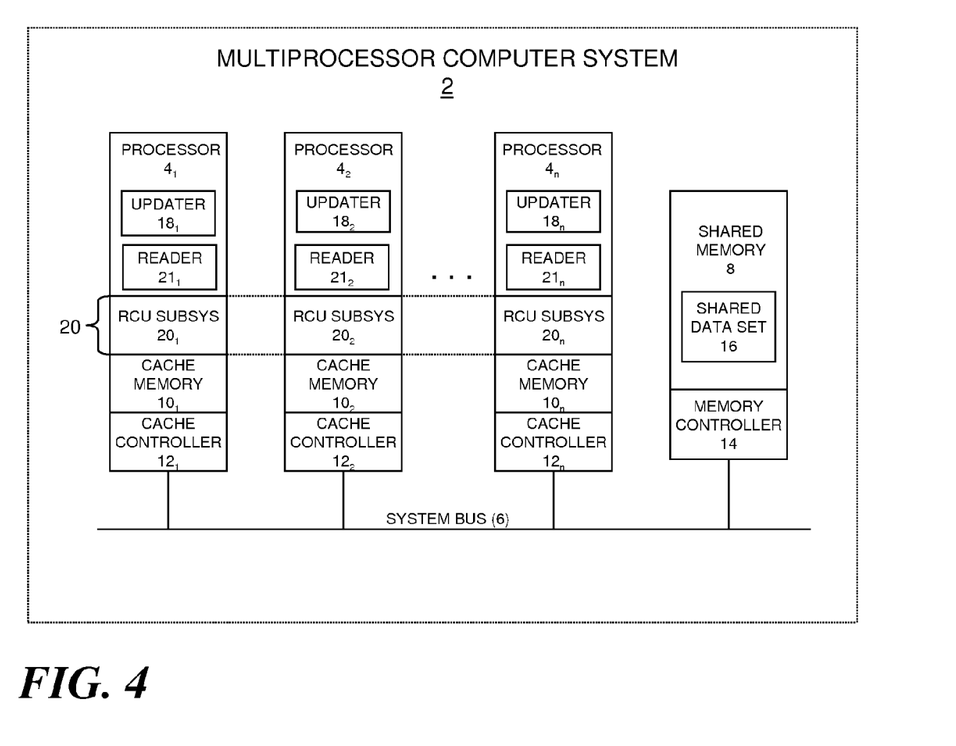
FIG. 4 is a functional block diagram showing a multiprocessor computing system that represents an example environment for implementing grace period processing in accordance with the disclosure herein.

Turning now to the figures, wherein like reference numerals represent like elements in all of the several views, FIG. 4 illustrates an example of a computing environment in which the low-power technique described herein may be implemented. In particular, a symmetrical multiprocessor (SMP) computing system 2 is shown in which multiple processors $4_1, 4_2 \ldots 4_n$ are connected by way of a common system bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment.

It is further assumed that update operations executed within kernel or user mode processes, threads, or other execution contexts will periodically perform updates on a set of shared data 16 stored in the shared memory 8. Reference numerals $18_1, 18_2 \ldots 18_n$ illustrate individual data update operations (updaters) that may periodically execute on the several processors $4_1, 4_2 \ldots 4_n$. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$ are programmed to implement a read-copy update (RCU) subsystem 20, as by periodically executing respective RCU instances $20_1, 20_2 \ldots 20_n$ as part of their operating system or user application functions. Each of the processors $4_1, 4_2 \ldots 4_n$ also periodically executes read operations (readers) $21_1$, $21_2 \ldots 21_n$ on the shared data 16. Such read operations will typically be performed far more often than updates, this being one of the premises underlying the use of read-copy update.

One of the functions performed by the RCU subsystem 20 is grace period processing for deferring the destruction of a shared data element until pre-existing references to the data element are removed. This processing entails starting new grace periods and detecting the end of old grace periods so that the RCU subsystem 20 knows when it is safe to free stale data elements. In RCU implementations designed to handle non-preemptible readers (hereinafter referred to as "non-preemptible RCU"), grace periods are tracked by requiring each processor that might be running an RCU reader to pass through a quiescent state. For example, an RCU updater may update a data element and then send every remaining processor an inter-processor interrupt (IPI). The IPI wakes up each processor (if it is in a low power state) and the interrupt handler runs code to set a flag indicating that the processor should reschedule. Alternatively, an RCU updater may update a data element and then schedule a thread or a daemon that runs on the other processors, thereby forcing the processors to perform context switches. By way of further example, an updater may update a data element and then set a quiescent state bit mask containing one bit for each of the remaining processors. Each time a given processor reaches a quiescent state, it clears its bit in the bit mask. The grace period expires when all of the bits are cleared.

According to another example of RCU grace period processing, an updater may perform a shared data element update and then enqueue a callback onto a per-processor callback list. After some number of callbacks has accumulated, this processor requests all other processors to pass through a quiescent state. As each processor learns of the request, it takes a snapshot of one or more per-processor quiescent state counters that are incremented each time a quiescent state is detected. Each processor periodically compares its snapshot against the current value(s) of its counter(s). As soon as any counter differs from the snapshot, the processor records the fact that it has passed through a quiescent state. The last processor to record that it has passed through a quiescent state also records the fact that the grace period has ended. When the original processor learns that the grace period has ended, it executes all of its callbacks that were waiting for the end of that grace period. In a variation of the foregoing, a processor that needs to process callbacks increments a per-processor counter and starts a token-passing cycle. When a neighbor processor sees that the incremented counter is greater than its own per-processor counter, it increments its counter to be one larger than the neighbor's counter. This occurs on each processor until the token circulates back to original processor, at which point this processor processes all callbacks that were pending when the token was first passed.

It will be appreciated that each of the foregoing grace period processing techniques is incompatible with low-power state processor operation because the quiescent state processing required for grace period advancement will not occur when a processor is sleeping. Even a relatively mild low power state such as dynamic tick may be problematic if normal clock timer interrupts are required to drive the grace period processing.

In order to support low-power state processor operation, the RCU subsystem 20 of FIG. 4 may be adapted to avoid unnecessary wakeups of processors that are in low-power states. In particular, the RCU subsystem 20 may interpret a low-power processor state as a quiescent state if the low-power state means that no RCU readers are capable of running on the processor in question. This will be the case for non-preemptible RCU because a processor may not enter a low-power state with runnable tasks and non-preemptible RCU readers always remain runnable until they pass through a quiescent state. Therefore, the RCU subsystem 20 may assume that a processor in a low power state has no active RCU readers, and need not wake up that processor.

The RCU subsystem 20 may arrange for a power status notification from the processors $4_1, 4_2 \ldots 4_n$ as they enter or leave a low-power state. The notification may be provided in any appropriate fashion. For example, in some implementations the existing power control logic may already provide a generic mechanism by which processor power states are discernable by other processors. If such a mechanism does not exist, each processor $4_1, 4_2 \ldots 4_n$ may be programmed to explicitly store per-processor power status information whenever the processor enters a low-power state. Without limiting the generality of the foregoing, one way that a processor could store power status information would be to manipulate a per-processor power status indicator, such as by setting a per-processor flag when the processor enters a low-power state and clearing the flag when it leaves the low-power state. A processor $4_1, 4_2 \ldots 4_n$ could manipulate such an indicator whenever it enters or exists a low-power state. The RCU subsystem 20 could then obtain a power status notification from each processor by querying all of the power status indicators. The power status notification will allow the RCU subsystem 20 to keep track of which of the processors $4_1$, $4_2 \ldots 4_n$ are and are not in a low-power state, and avoid waking those processors if possible.

In the system 2 of FIG. 4, instead of simply waking up the processors $4_1, 4_2 \ldots 4_n$ to perform quiescent state processing in response to grace period processing actions, the RCU subsystem 20 may first consult each processor's stored power status information to determine the power status of that processor. If the power status information indicates that a processor $4_1, 4_2 \ldots 4_n$ is at full power, the RCU subsystem 20 may rightfully ask the processor to perform the quiescent state processing needed to facilitate grace period advancement. Indeed, if the processor $4_1, 4_2 \ldots 4_n$ is running an RCU reader $21_1, 21_2 \ldots 21_n$, the processor will have to implement a quiescent state in order to protect the reader from possible corruption and data loss. On the other hand, if the power status information indicates that a processor $4_1, 4_2 \ldots 4_n$ is in a low-power state (and thus has no active RCU reader $21_1$, $21_2 \ldots 21_n$), the RCU subsystem 20 may safely ignore the processor's lack of quiescent state verification. It may designate the processor as having passed through a quiescent state because the processor's low power state is tantamount to a quiescent state. Due to such low-power-aware grace period processing, the processor $4_1, 4_2 \ldots 4_n$ can remain in the low-power state and need not be woken up unnecessarily, thereby conserving power while allowing grace period processing to proceed despite the absence of quiescent state verification from the low-power processors. Grace periods may thus advance in orderly fashion without compromising low-power state operation.

Figure 5:
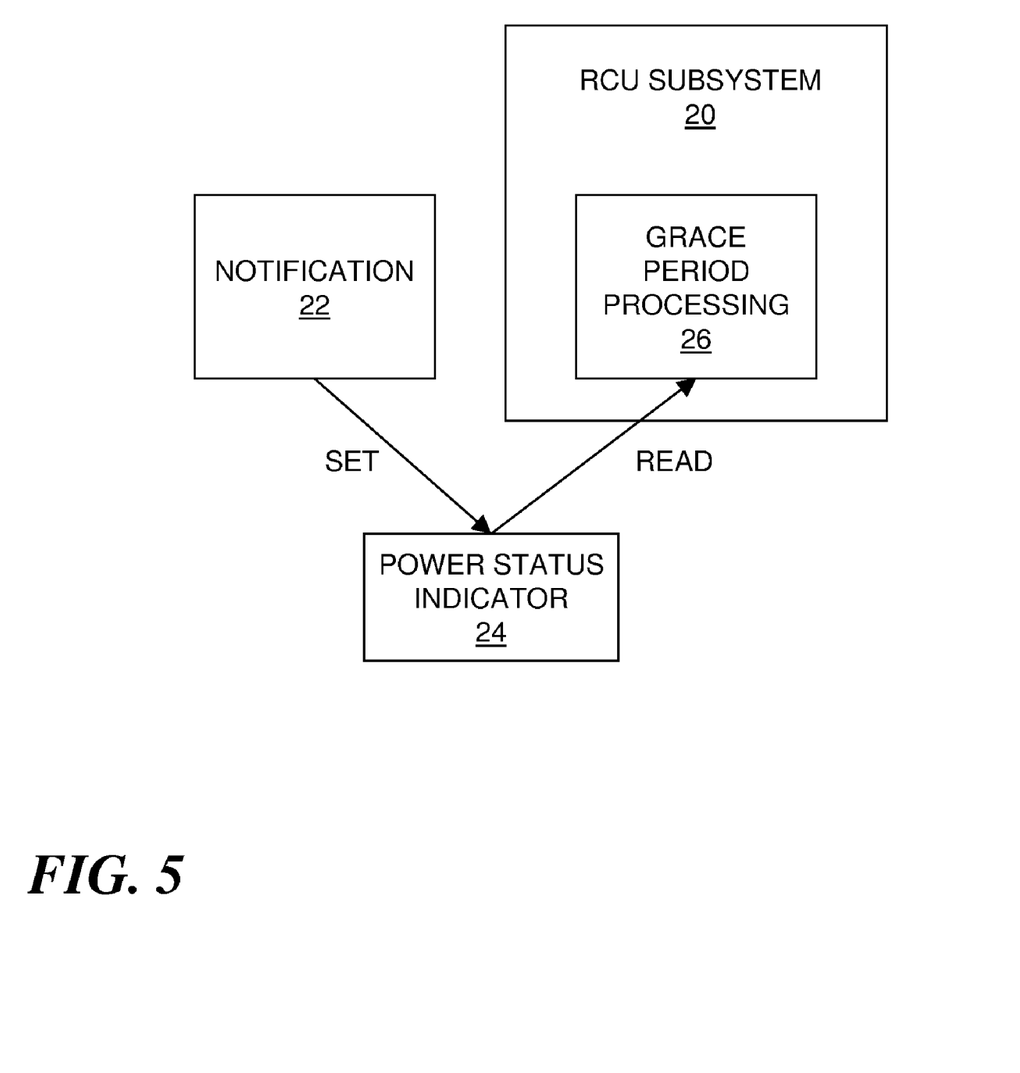
FIG. 5 is a functional block diagram showing a read-copy update subsystem implemented by each processor in the multiprocessor computer system of FIG. 4.

The foregoing processing may be implemented by the logic shown in FIG. 5, which is presented by way of example only. In particular, a notification component 22 may periodically run on each processor $4_1, 4_2 \ldots 4_n$ and manipulate a per-processor power status indicator 24 in response to changes in processor power status. As discussed above, the notification component 22 could be provided by generic power state control logic that provides processor power status information that is accessible by other processors. In other cases, the notification component 22 will need to be created. As further shown in FIG. 5, a grace period processing component 26 within the RCU subsystem 20 may likewise periodically run one each processor $4_1, 4_2 \ldots 4_n$. When it does, the grace period processing component 26 may consult the power state status indicator 24 of all other processors $4_1, 4_2 \ldots 4_n$ whenever it implements a grace period processing action that requires quiescent state verification from those processors. The grace period processing component 26 may be implemented in a variety of ways. For example, it may be an RCU primitive or other function that is called by an updater $18_1, 18_2 \ldots 18_n$ on one processor $4_1, 4_2 \ldots 4_n$ in order to force quiescent states on the other processors and thereby advance a grace period. The grace period processing component 26 may also be a routine that periodically runs on each processor $4_1, 4_2 \ldots 4_n$ in order to process callbacks. When this routine is invoked on a given processor $4_1, 4_2 \ldots 4_n$ it needs to verify that the remaining processors have implemented quiescent states before callbacks can be processed. Regardless of how the grace period processing component 26 is implemented, it may be able to avoid unnecessary wake ups of one or more processors if their power status is such that no quiescent state processing needs to be requested. In this way, grace periods may be advanced even with one or more processors in low-power states. One example of how this may be achieved will now be described with reference to FIGS. 6 and 7.

Figure 6:
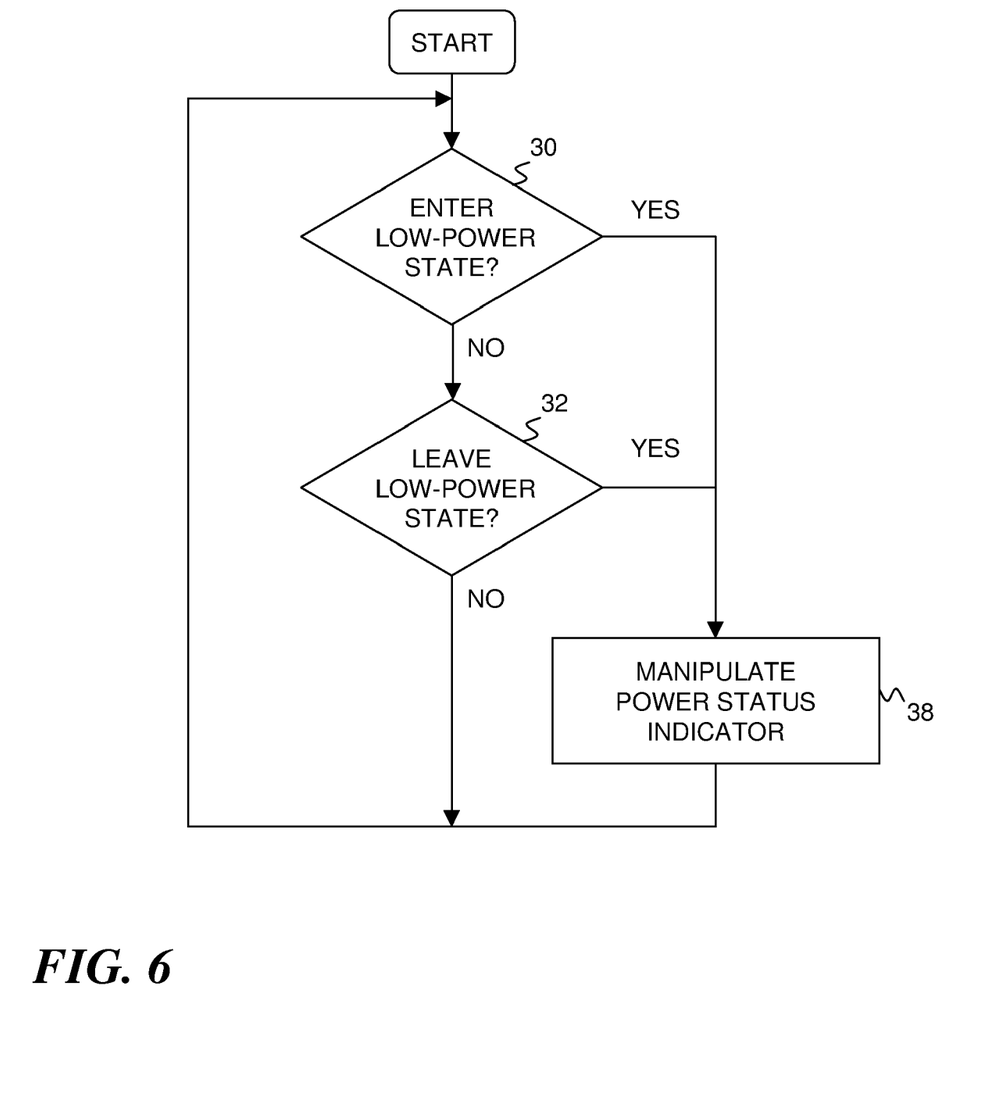
FIG. 6 is a flow diagram showing an example of power status notification processing that may be performed by the processors of the multiprocessor computer system of FIG. 4.

FIG. 6 depicts an example of notification processing that may be performed by the notification component 22 on all processors $4_1, 4_2 \ldots 4_n$ as they enter and leave low-power states. Blocks 30 and 32 respectively check for entry into a low-power state and exit from a low-power state. In block 34 the power status indicator 24 is set according to which of the conditions of blocks 30-32 is satisfied. For example, if the power status indicator 24 is a flag, it may be set when entering a low-power state and cleared when leaving a low-power state.

Figure 7:
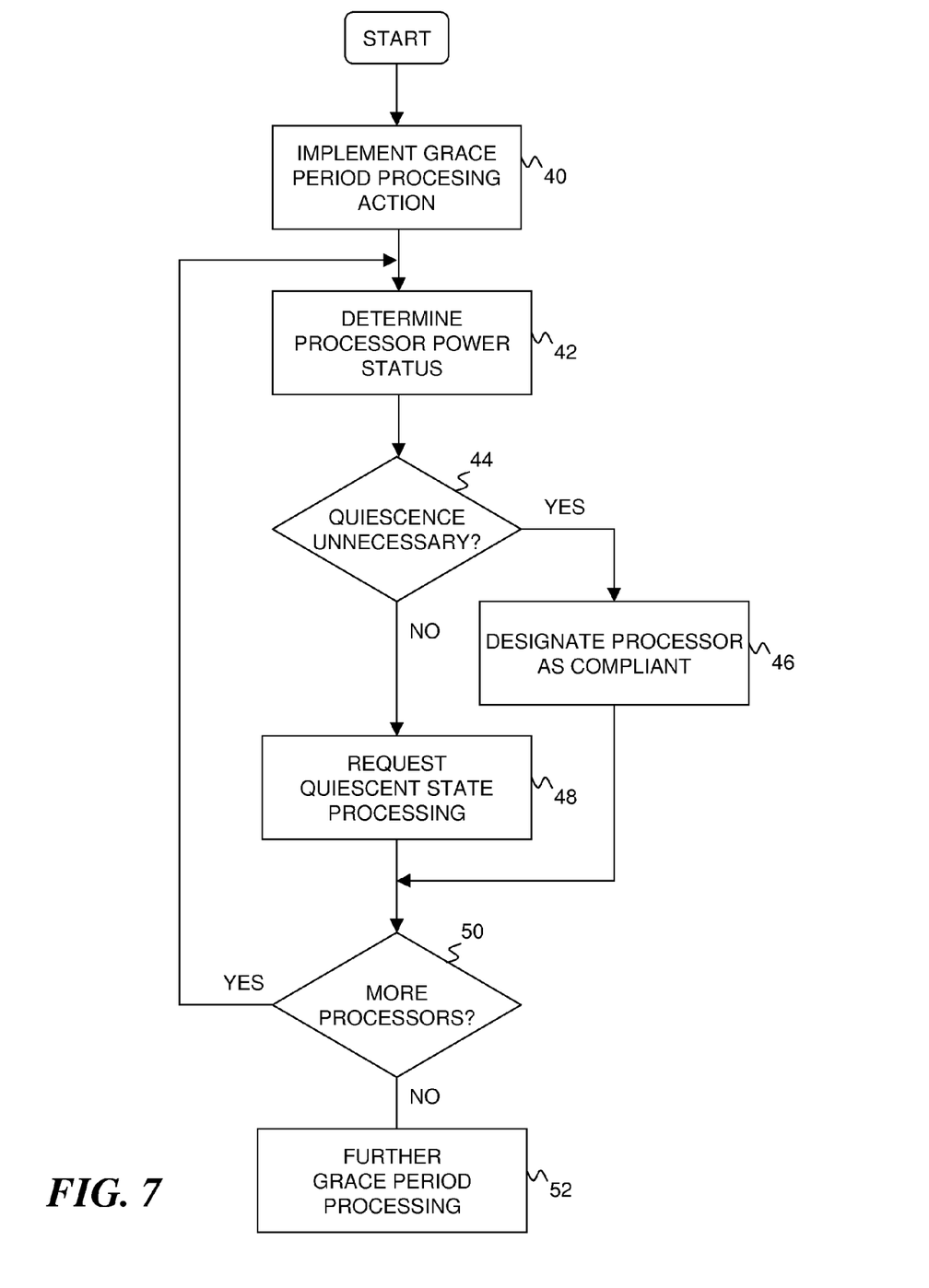
FIG. 7 is a flow diagram showing an example of grace period processing that may be performed by the processors of the multiprocessor computer system of FIG. 4.

FIG. 7 depicts an example of grace period processing that may be performed by the grace period processing component 26 as it runs on one of the processors $4_1, 4_2 \ldots 4_n$ and determines whether it needs to interact with the other processors to request quiescent state processing. In block 40, a grace period processing action is implemented that requires all other processor $4_1, 4_2 \ldots 4_n$ that may be running a non-preemptible RCU reader $21_1, 21_2 \ldots 21_n$ to implement quiescent states before further grace period processing can proceed. For example, block 40 could represent an updater $18_1, 18_2 \ldots 18_n$ invoking the grace period processing component 26 following a data update so that a stale data element can be freed. Alternatively, block 40 could represent a periodic invocation of the grace period processing component 26 (e.g., due to a clock timer interrupt, by a scheduler, etc.) in order to process accumulated callbacks. In block 42, the grace period processing component 26 determines a power status of one of the other processors $4_1, 4_2 \ldots 4_n$. In block 44, the grace period processing component determines whether the power status of the processor $4_1, 4_2 \ldots 4_n$ indicates that quiescent state processing by this processor is unnecessary. This may be based on whether or not the processor $4_1, 4_2 \ldots 4_n$ is currently in a low-power state. If it is, block 46 designates the processor as having performed the required quiescent state processing and proceeds to block 50 to evaluate the next processor. If block 44 produces a false result, block 48 is implemented and the grace period processing component 26 requests the processor to perform quiescent state processing. Block 50 causes the processing of FIG. 7 to return to block 42 for each remaining processor $4_1, 4_2 \ldots 4_n$. If all the processors $4_1, 4_2 \ldots 4_n$ have either passed through a quiescent state or have no RCU readers $21_1, 21_2 \ldots 21_n$ as a result of being in a low-power state, block 52 may be invoked in order to perform further grace period processing. As mentioned above, this processing could constitute freeing a stale data element or processing callbacks. Other further grace period processing actions could also be performed. For example, if the shared data 16 governs a mode of operation of the system 2, the further grace period processing could comprise changing the mode of operation in accordance with the data element update.

One final aspect of the disclosed technique that is worthy of mention is that it supports the grace period processing component 26 when the latter is implemented using a thread or daemon called by a clock timer interrupt. In such an implementation, the grace period processing component 26 is responsible for both initiating quiescent state processing on other processors and for performing such processing. In particular, the grace period processing component 26 could initiate grace period token processing on one processor, terminate at the end of the current interrupt, and then be re-invoked on the next interrupt on a neighbor processor to perform token processing there. The grace period processing component 26 will encounter the token that it previously passed and hand it off to another processor on which the grace period processing component will execute during the next interrupt, and so on. If all the processors $4_1, 4_2 \ldots 4_n$ are awake, the grace period processing component 26 will make the rounds on all processors, the quiescent state processing will complete and grace period detection will advance to the next stage (e.g., by processing all callbacks on the processor that initiated the grace period processing action). One consequence of using a low-power dynamic tick mode is that the grace period processing component 26, being dependent on a clock timer interrupt, may not advance through the processors due to the absence of clock timer ticks. An advantage of the low-power technique disclosed herein is that the grace period processing component 26 need not run on processors $4_1, 4_2 \ldots 4_n$ that are in a low power dynamic tick state with no RCU readers $21_1, 21_2 \ldots 21_n$. Thus, the fact that its clock timer interrupt does not execute during dynamic tick mode is irrelevant.

Figure 8:
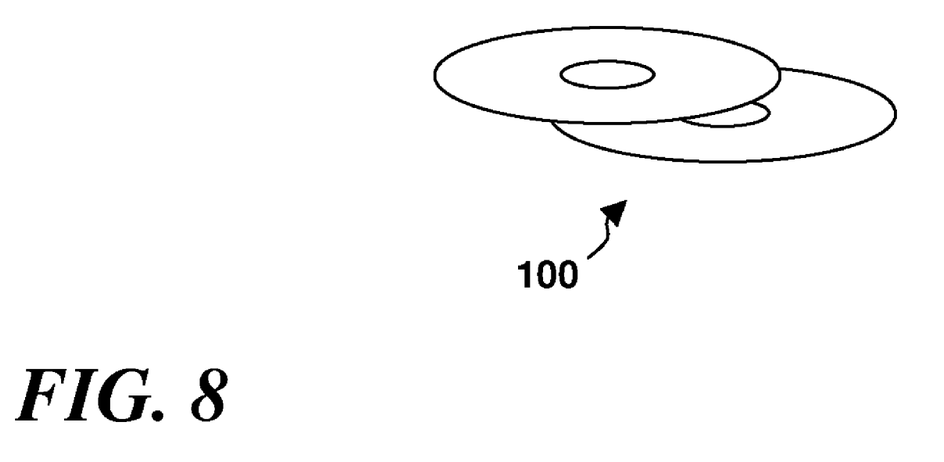
FIG. 8 is a diagrammatic illustration showing media that may be used to provide a computer program product for implementing grace period processing in accordance with the disclosure herein.

Accordingly, a technique for optimizing preemptible read-copy update for low-power usage has been disclosed that avoids unnecessary wakeups and facilitates grace period processing state advancement. It will be appreciated that the foregoing concepts may be variously embodied in any of a data processing system, a machine implemented method, and a computer program product in which programming logic is provided by one or more machine-useable media for use in controlling a data processing system to perform the required functions. An example of machine-useable media that may be used to provide such programming logic is shown by reference numeral 100 in FIG. 8. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality, such as an operating system. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium (such as a network), or other entity that can contain, store, communicate, propagate or transport the programming logic for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for low-power detection of a grace period following a shared data element update operation that affects non-preemptible data readers, comprising:
    implementing a grace period processing action that requires a processor that may be running a non-preemptible reader of said shared data element to pass through a quiescent state before further grace period processing can proceed, said quiescent state ensuring that said reader will not be affected by said further grace period processing;
    determining a power status of said processor; and
    proceeding with said further grace period processing without requiring said processor to pass through said quiescent state based solely on said power status indicating that quiescent state processing by said processor is unnecessary.

2. A method in accordance with claim 1, wherein said power status comprises said processor being in either a non-low-power state or a low-power state.

3. A method in accordance with claim 2, wherein said low-power state includes said processor being in a dynamic tick timer mode.

4. A method in accordance with claim 1, wherein said power status is determined by a current power state of said processor and said processor is designated as having passed through said quiescent state if said current power state is a low-power state.

5. A method in accordance with claim 1, wherein said power status is determined from a power status indicator that is manipulated by said processor when said processor enters or leaves a low-power state.

6. A method in accordance with claim 1, wherein said further grace period processing comprises one or more of freeing said shared data element, processing a callback that frees said shared data element, or changing a mode of operation determined by said shared data element.

7. A system adapted for low-power detection of a grace period following a shared data element update operation that affects non-preemptible data readers, comprising:
    one or more processors;
    a memory coupled to said one or more processors, said memory including a computer useable medium tangibly embodying at least one program of instructions executable by said processor to perform operations, comprising:
    implementing a grace period processing action that requires a processor that may be running a non-preemptible reader of said shared data element to pass through a quiescent state before further grace period processing can proceed, said quiescent state ensuring that said reader will not be affected by said further grace period processing;
    determining a power status of said processor; and
    proceeding with said further grace period processing without requiring said processor to pass through said quiescent state based solely on said power status indicating that quiescent state processing by said processor is unnecessary.

8. A system in accordance with claim 7, wherein said power status comprises said processor being in either a non-low-power state or a low-power state.

9. A system in accordance with claim 8, wherein said low-power state includes said processor being in a dynamic tick timer mode.

10. A system in accordance with claim 7, wherein said power status is determined by a current power state of said processor and said processor is designated as having passed through said quiescent state if said current power state is a low-power state.

11. A system in accordance with claim 7, wherein said power status is determined from a power status indicator that is manipulated by said processor when said processor enters or leaves a low-power state.

12. A system in accordance with claim 7, wherein said further grace period processing comprises one or more of freeing said shared data element, processing a callback that frees said shared data element, or changing a mode of operation determined by said shared data element.

13. A computer program product for low-power detection of a grace period following a shared data element update operation that affects non-preemptible data readers, comprising:
    one or more machine-useable non-transitory media;
    logic provided by said one or more media for programming a data processing platform to operate as by:
    implementing a grace period processing action that requires a processor that may be running a non-preemptible reader of said shared data element to pass through a quiescent state before further grace period processing can proceed, said quiescent state ensuring that said reader will not be affected by said further grace period processing;
    determining a power status of said processor; and
    proceeding with said further grace period processing without requiring said processor to pass through said quiescent state based solely on said power status indicating that quiescent state processing by said processor is unnecessary.

14. A computer program product in accordance with claim 13, wherein said power status comprises said processor being in either a non-low-power state or a low-power state.

15. A computer program product in accordance with claim 14, wherein said low-power state includes said processor being in a dynamic tick timer mode.

16. A computer program product in accordance with claim 13, wherein said power status is determined by a current power state of said processor and said processor is designated as having passed through said quiescent state if said current power state is a low-power state.

17. A computer program product in accordance with claim 13, wherein said power status is determined from a power status indicator that is manipulated by said processor when said processor enters or leaves a low-power state.

18. A computer program product in accordance with claim 13, wherein said further grace period processing comprises one or more of freeing said shared data element, processing a callback that frees said shared data element, or changing a mode of operation determined by said shared data element.

19. A computer program product for low-power detection of a grace period following a shared data element update that affects non-preemptible data readers, comprising:
    one or more machine-useable non-transitory media;
    logic provided by said one or more media for programming a data processing platform to operate as by:

implementing a grace period processing action that requires a processor that may be running a non-preemptible reader of said shared data element to pass through a quiescent state before further grace period processing can proceed, said quiescent state ensuring that said reader will not be affected by said further grace period processing;

determining a power status of said processor; and proceeding with said further grace period processing without requiring said processor to pass through said quiescent state based solely on said power status indicating that quiescent state processing by said processor is unnecessary;

said power status comprising said processor being in either a non-low-power state or a low-power state;

said low-power state including said processor being in a dynamic tick timer mode;

said power status is determined by a current power state of said processor and said processor is designated as having passed through said quiescent state if said current power state is a low-power state; and said power status being determined from a power status indicator that is manipulated by said processor when said processor enters or leaves a low-power state.

20. A computer program product in accordance with claim 19, wherein said further grace period processing comprises one or more of freeing said shared data element, processing a callback that frees said shared data element, or changing a mode of operation determined by said shared data element.

\* \* \* \* \*